(12) United States Patent
Boulant

(10) Patent No.: US 7,201,849 B2
(45) Date of Patent: *Apr. 10, 2007

(54) SIMPLIFIED LAMELLAR CLARIFIER AND METHOD FOR CLEANING SAME

(75) Inventor: Alain Boulant, Pornichet (FR)

(73) Assignee: Innova Environnement, Ancenis (FR)

( * ) Notice: Subject to any disclaimer, the term of this patent is extended or adjusted under 35 U.S.C. 154(b) by 158 days.

This patent is subject to a terminal disclaimer.

(21) Appl. No.: 10/500,848

(22) PCT Filed: Jan. 8, 2003

(86) PCT No.: PCT/FR03/00036

§ 371 (c)(1),
(2), (4) Date: Jul. 7, 2004

(87) PCT Pub. No.: WO03/078019

PCT Pub. Date: Sep. 25, 2003

(65) Prior Publication Data

US 2005/0082220 A1    Apr. 21, 2005

(30) Foreign Application Priority Data

Jan. 8, 2002    (FR) .................................. 02 00156

(51) Int. Cl.
  *B01D 21/02*    (2006.01)
(52) U.S. Cl. .................... 210/802; 210/521; 210/532.1
(58) Field of Classification Search ................ 210/521, 210/522, 802, 532.1, 540
See application file for complete search history.

(56) References Cited

U.S. PATENT DOCUMENTS

| | | | | |
|---|---|---|---|---|
| 2,573,615 A | * | 10/1951 | Seailles | ........................ 210/521 |
| 3,903,000 A | * | 9/1975 | Miura et al. | ................. 210/522 |
| 4,194,976 A | * | 3/1980 | Robinsky | ..................... 210/521 |
| 4,514,303 A | | 4/1985 | Moore | |
| 4,865,753 A | | 9/1989 | Meurer | |
| 4,889,624 A | | 12/1989 | Soriente et al. | |

(Continued)

FOREIGN PATENT DOCUMENTS

DE    4302003    8/1994

(Continued)

OTHER PUBLICATIONS

Translation of French patent 2,754,733, Apr. 1988.*

(Continued)

*Primary Examiner*—Christopher Upton
(74) *Attorney, Agent, or Firm*—Stevens, Davis, Miller & Mosher, LLP

(57) ABSTRACT

The invention concerns a lamellar clarifier (1) comprising: a) a tank (3) for liquid to be clarified (5), b) means for conveying said liquid (5) into a lower zone (9) of said tank (3), c) means (11) for evacuating said liquid (5) from an upper zone (13) of the tank (3), and d) a plurality of settling plates (Di) arranged inside said tank (3), said plates (Di) being substantially parallel and uniformly spaced apart from one another so as to define a plurality of passages (IIi) extending between said lower (9) and upper (13) zones. Said clarifier is characterized in that it further comprises tubular members (Ti) integral with said plates (Di), and oscillating fixing means (Ai) interposed between said tubular members (Ti) and said tank (3).

5 Claims, 2 Drawing Sheets

U.S. PATENT DOCUMENTS

| | | | |
|---|---|---|---|
| 4,957,628 A | | 9/1990 | Schulz |
| 5,338,449 A | * | 8/1994 | Ichiyanagi et al. ......... 210/521 |
| 5,391,306 A | | 2/1995 | Meurer |
| 5,700,378 A | * | 12/1997 | Lee et al. ................... 210/802 |
| 6,245,243 B1 | | 6/2001 | Meurer |

FOREIGN PATENT DOCUMENTS

| | | |
|---|---|---|
| DE | 29623598 | 11/1998 |
| FR | 2688416 | 9/1993 |
| FR | 2754733 | 4/1998 |
| HU | 165164 | 3/1976 |
| HU | 185606 | 12/1986 |

OTHER PUBLICATIONS

Office Action of Aug. 30, 2005 in U.S. Appl. No. 10/493,237.
International Search Report dated Apr. 28, 2003.
Patent Abstract of Japan; vol. 1999, No. 5, May 31, 1999, & JP 11 033310 A (Nippon Enbairo Kogyo KK), Feb. 9, 1999.
Search Report dated Sep. 7, 2004 with English translation.

* cited by examiner

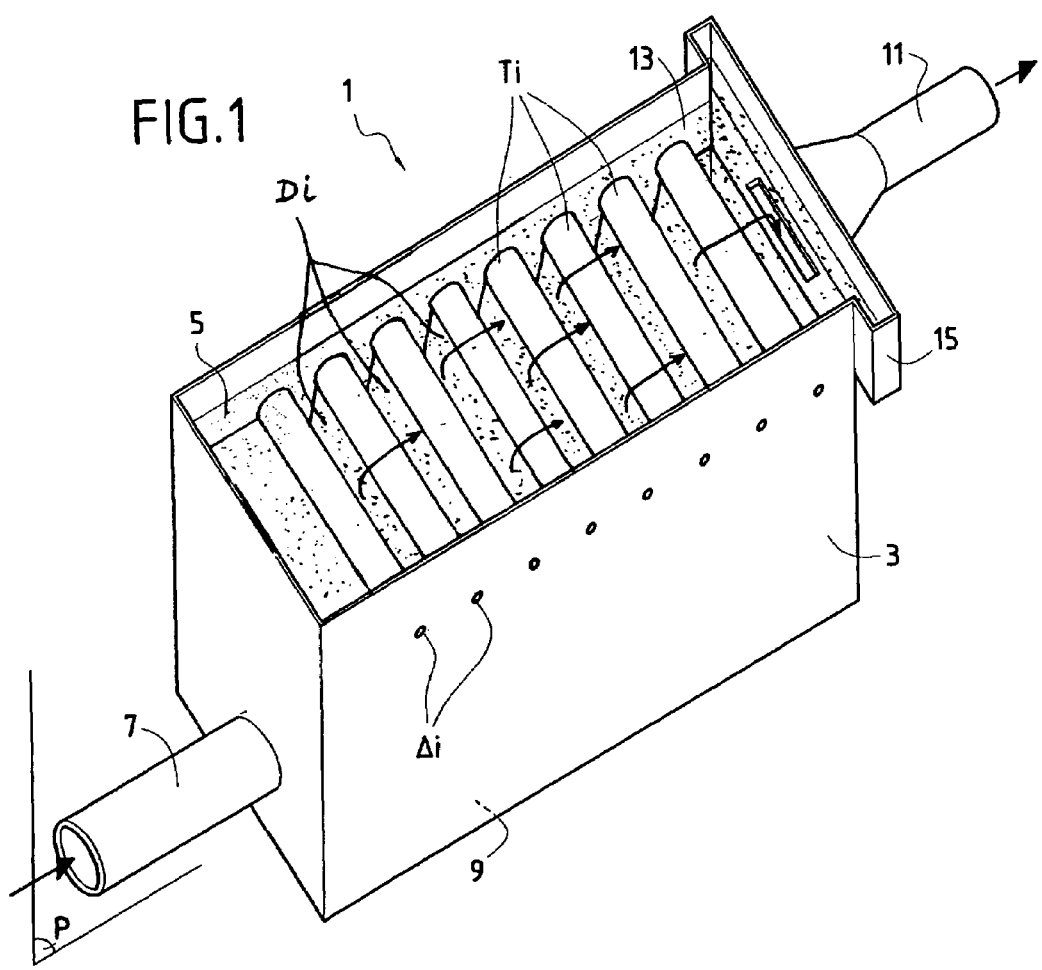
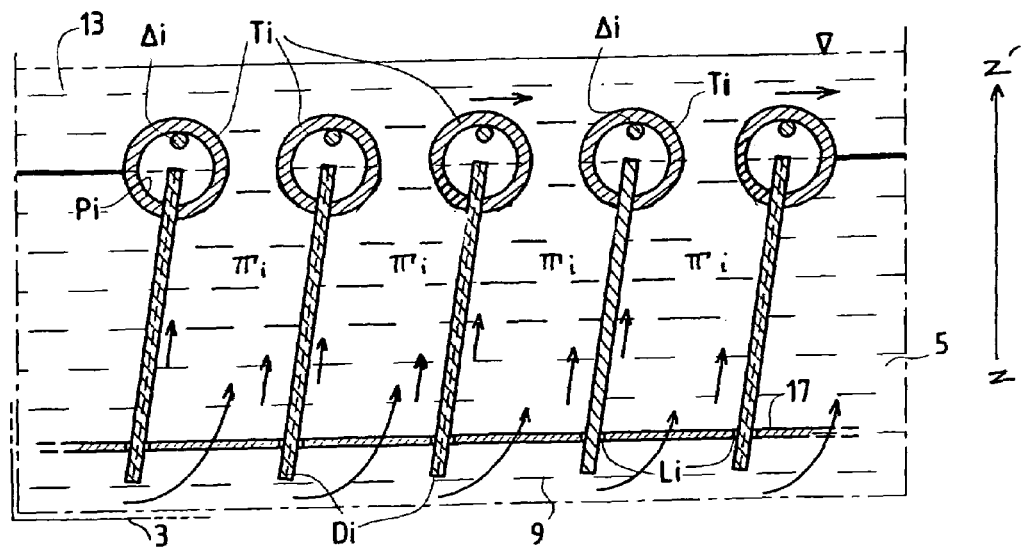

SIMPLIFIED LAMELLAR CLARIFIER AND METHOD FOR CLEANING SAME

The present invention relates to a simplified lamellar clarifier and to a method of cleaning this clarifier.

The document FR 2 754 733 discloses a lamellar clarifier of the type comprising a) a tank for liquid to be clarified, b) means for conducting said liquid into a lower region of said tank, c) means for evacuating said liquid from an upper region of said tank, and d) a plurality of clarifier plates disposed inside said tank, said plates being substantially parallel and regularly spaced to define a plurality of passages between said lower region and said upper region.

In this prior art clarifier, the clarifier plates are mounted on and fastened to pivot shafts themselves mounted to rotate in notches formed in the walls of the tank of the clarifier.

There being high friction between these pivot shafts and the walls of the clarifier, it is necessary to envisage means that are sufficiently heavy to overcome this friction when it is required to modify the inclination of the clarifier plates.

Apart from the fact that such means require a high force to maneuver them, they are costly to fabricate.

An object of the present invention is to provide a simplified clarifier that reduces these problems.

This object of the invention is achieved with a lamellar clarifier of the type comprising a) a tank for liquid to be clarified, b) means for conducting said liquid into a lower region of said tank, c) means for evacuating said liquid from an upper region of said tank, and d) a plurality of clarifier plates disposed inside said tank, said plates being substantially parallel and regularly spaced to define a plurality of passages between said lower region and said upper region, noteworthy in that it further comprises tubular members fastened to said plates and pendular fixing means between said tubular members and said tank.

The pendular type suspension of the clarifier plates on the walls of the tank considerably reduces the friction occurring on pivoting of these plates and thereby minimizes the weight of the structure for actuating these plates, and therefore, in the final analysis, provides a clarifier of relatively low cost that is easy to maneuver.

According to other features of the clarifier according to the invention:

said clarifier comprises means for calibrating the flow of said liquid between said passages and said upper region;

said clarifier comprises means for varying conjointly the inclination of said clarifier plates;

said inclination variation means comprise at least one actuation bar connected by a sliding pivoting type link to said clarifier plates.

The present invention also relates to a method of cleaning the foregoing clarifier which comprises the step of placing said clarifier plates in a position substantially parallel to the vertical.

The present invention also relates to a method of cleaning the foregoing clarifier which comprises the step of oppositely inclining said clarifier plates relative to their operating position.

Other features and advantages of the clarifier according to the invention will become apparent on reading the following description and examining the appended drawings, in which:

FIG. 1 is a perspective view of the clarifier according to the invention,

FIG. 2 is a partial view in section on the plane P of FIG. 1 of the clarifier from that figure in an operating configuration.

In these figures, the same reference numbers designate identical or analogous units or sets of units.

Figure 3:
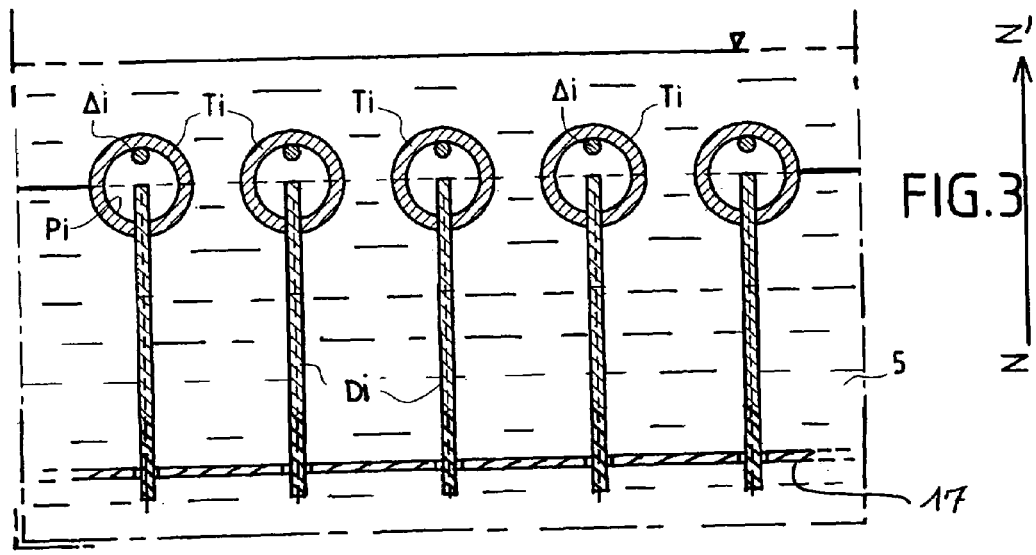
FIG. 3 is analogous to FIG. 2, with the clarifier in a first cleaning configuration.

Refer now to FIG. 1, in which it can be seen that the clarifier 1 according to the invention comprises a tank 3 of liquid 5 to be clarified having, firstly, a liquid feed pipe 7 discharging into a lower region 9 of the tank 3 and, secondly, a liquid evacuation pipe 11 communicating with an upper region 13 of the tank 3, for example by way of a trough 15 for recovering the liquid 5.

Inside the tank 3 is a plurality of clarifier plates $D_i$.

Tubular members $T_i$ are fastened to these plates.

Refer now to FIG. 2 for more details on the arrangement inside the tank 3 of the plates $D_i$ and the tubular members $T_i$.

As is apparent in this figure, the plates $D_i$ are substantially parallel and regularly spaced to define a plurality of passages $\pi_i$ between the lower region 9 and the upper region 13 of the tank 3.

The tubular members $T_i$ are connected to the walls of the tank 3 in a pendular manner, i.e. with the inside walls $P_i$ of each of the members $T_i$ resting on fingers $\Delta_i$ fastened to the walls of the tank 3.

Each tubular member $T_i$ is split lengthwise to receive a plate $D_i$, with conventional fixing means (not shown) such as pins fastening together the tubular members and the plates.

The clarifier according to the invention may optionally comprise means for calibrating the flow of liquid between the passages $\pi_i$ and the upper region 13 of the tank 3.

The plates $D_i$ may be made of sheet metal, for example, and the tubular members $T_i$ may be made of plastic material, for example.

The tubular members $T_i$ are preferably closed at their ends, i.e. have two partitions closing the cavity defined by each of these members in the vicinity of its two ends.

It should also be noted that, as can be seen in FIG. 2 and FIG. 3, there is at least one bar 17, and preferably two parallel bars, in the lower region 9 of the tank 3.

Figure 4:
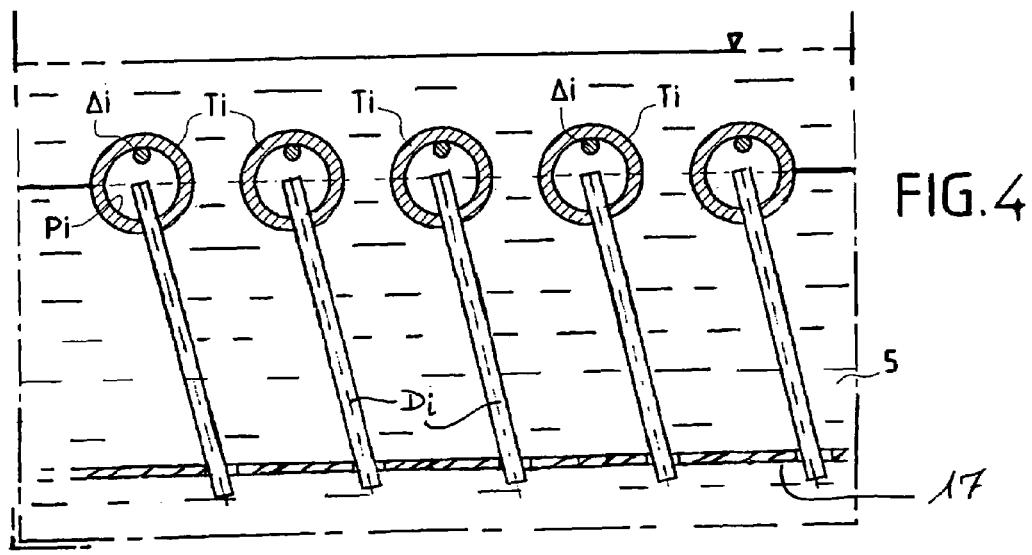
FIG. 4 is analogous to FIG. 3, with the clarifier in a second cleaning configuration.

The bars 17 are connected to each plate $D_i$ by a sliding pivot type link $L_i$ so that purely horizontal displacement of the bars (i.e. displacement thereof parallel to and at a constant distance from the bottom of the tank 3) varies the inclination of the plates $D_i$, for example to change from an "operating" position depicted in FIG. 2, in which the plates $D_i$ are inclined to the vertical ZZ', to a first "cleaning" position depicted in FIG. 3, in which the plates $D_i$ are substantially parallel to this vertical, or to a second cleaning position depicted in FIG. 4, in which the plates $D_i$ are oppositely inclined to their operating position (i.e. inclined in a direction that is substantially symmetrical with respect to the vertical).

The operation and the advantages of the clarifier according to the invention are described next.

The path of the liquid to be clarified when the clarifier is operating is that indicated by the arrows in FIGS. 1 and 2.

As may be seen in FIG. 1, the liquid 5 to be clarified first enters the lower region 9 of the tank 3 via the liquid feed pipe 7.

Then, as may be seen in FIG. 2, the liquid 5 to be clarified rises in the passages $\pi_i$, after which it flows between the tubular members $T_i$ until it reaches the upper region 13 of the tank 3, after which it is evacuated from the tank via the trough 15 and the pipe 11.

As the liquid 5 flows upward along the plates Di, materials in suspension in the liquid are deposited on the plates Di, and most of these materials then slide toward the bottom of the tank 3.

It has been found that clarification remained entirely satisfactory, even in the absence of calibration means at the exit from the passages πi.

However, a fraction of the materials in suspension remains stuck to the plates Di, forming a deposit known as sludge, making it necessary to halt the clarifying operations periodically and clean the plates Di.

To this end, the bars 17 may be actuated to move the plates Di from the inclined position of FIG. 2 to the vertical position of FIG. 3.

Once the plates Di are in a substantially vertical position, some of the sludge collected on the plates falls to the bottom of the tank 3 under its own weight.

If necessary, the plates Di may be "oppositely" inclined, as shown in FIG. 4, to cause recalcitrant sludge to fall off.

Furthermore, a jet of water, for example, may be introduced between the plates Di to separate the residue of sludge stuck to these plates.

As has now become clear, the lamellar clarifier according to the invention achieves good results whilst being of highly simplified design compared to the prior art.

The pendular type articulation of the first tubular members Ti to the walls of the tank 3 reduces the friction occurring on pivoting of the plates Di and thereby minimizes the weight of the structure for actuating these plates, namely the bars 17.

This reduction of friction also makes it possible to use simple sliding pivot type links Li, whereby the bars 17 may move at a constant distance from the bottom of the tank 3.

With no calibration means above the clarifier plates, a greater rotational excursion of these plates may be achieved.

These plates may therefore be moved almost to a position substantially parallel to the horizontal, which may prove very useful for treating liquids that do not clarify well.

Of course, the present invention is not limited to the embodiment described and shown, which is provided by way of illustrative and nonlimiting example.

The invention claimed is:

1. Lamellar clarifier of the type comprising:
   a) a tank for liquid to be clarified, said tank comprising walls,
   b) a conductor that conducts said liquid into a lower region of said tank,
   c) an evacuator that evacuates said liquid from an upper region of said tank,
   d) a plurality of clarifier plates disposed inside said tank, said plates being substantially parallel and regularly spaced to define a plurality of passages between said lower region and said upper region,
   e) hollow tubular members fastened to said plates, said hollow tubular members comprising inside walls, and
   f) pendular supporting members between said tubular members and said tank for supporting said tubular members such that said tubular members and their fastened clarifier plates may pivot in a pendular manner about said supporting members, said pendular supporting members comprising fingers fastened to the walls of said tank, wherein:
   said inside walls of the hollow tubular members rest on said fingers.

2. Clarifier according to claim 1, further comprising an inclination variation device that conjointly varies the inclination of said clarifier plates.

3. Clarifier according to claim 2, wherein said inclination variation device comprises at least one actuation bar connected by a sliding pivoting type link to said clarifier plates.

4. A method of cleaning a lamellar clarifier comprising a) a tank for liquid to be clarified, said tank comprising walls, b) a conductor that conducts said liquid into a lower region of said tank, c) an evacuator that evacuates said liquid from an upper region of said tank, d) a plurality of clarifier plates disposed inside said tank, said plates being substantially parallel and regularly spaced to define a plurality of passages between said lower region and said upper region, e) hollow tubular members fastened to said plates, said hollow tubular members comprising inside walls, and f) pendular supporting members between said tubular members and said tank for supporting said tubular members such that said tubular members and their fastened clarifier plates may pivot in a pendular manner about said supporting members, said pendular supporting members comprising fingers fastened to the walls of said tank, wherein said inside walls of the hollow tubular members rest on said fingers, the method comprising the step of placing said clarifier plates in a position substantially parallel to the vertical by pivoting the hollow tubular members about said fingers upon which said hollow tubular members rest.

5. A method of cleaning a lamellar clarifier comprising a) a tank for liquid to be clarified, said tank comprising walls, b) a conductor that conducts said liquid into a lower region of said tank, c) an evacuator that evacuates said liquid from an upper region of said tank, d) a plurality of clarifier plates disposed inside said tank, said plates being substantially parallel and regularly spaced to define a plurality of passages between said lower region and said upper region, e) hollow tubular members fastened to said plates, said hollow tubular members comprising inside walls, and f) pendular supporting members between said tubular members and said tank for supporting said tubular members such that said tubular members and their fastened clarifier plates may pivot in a pendular manner about said supporting members, said pendular supporting members comprising fingers fastened to the walls of said tank, wherein said inside walls of the hollow tubular members rest on said fingers, the method comprising the step of oppositely inclining said clarifier plates relative to their operating position by pivoting said hollow tubular members about said fingers upon which said hollow tubular members rest.

* * * * *